(No Model.)
C. A. HUSSEY.
Electric Lamp.
No. 241,366.  Patented May 10, 1881.
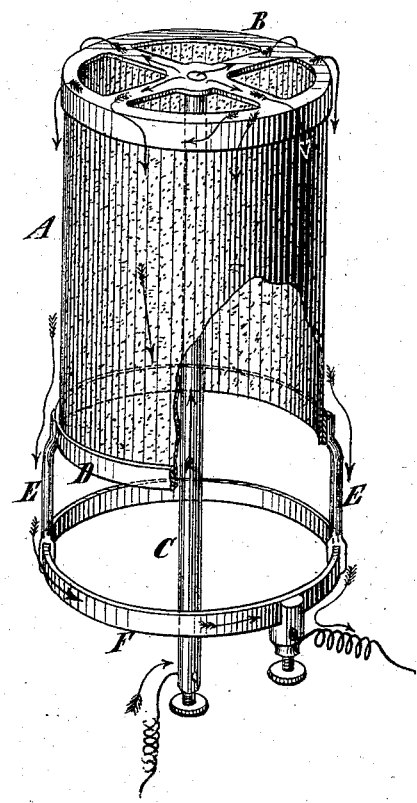
Witnesses
Jno. K. Haynes
Ed. Glatzmayer
Inventor
Charles A. Hussey
by his Attorneys
Brown & Brown

UNITED STATES PATENT OFFICE.

CHARLES A. HUSSEY, OF NEW YORK, N. Y., ASSIGNOR, BY DIRECT AND MESNE ASSIGNMENTS, TO THE HUSSEY ELECTRIC COMPANY, OF SAME PLACE.

ELECTRIC LAMP.

SPECIFICATION forming part of Letters Patent No. 241,366, dated May 10, 1881.

Application filed January 7, 1881. (No model.)

*To all whom it may concern:*

Be it known that I, CHARLES A. HUSSEY, of the city, county, and State of New York, have invented certain new and useful Improvements in Electric Lamps, of which the following is a specification.

My improvements relate to the kind of electric lamps wherein the light is produced by the incandescence of a carbon or body under the influence of an electric current passing through it.

The improvements consist in the combination, in an electric lamp, of a hollow carbon or body capable of being rendered incandescent by a current of electricity, a conductor of electricity applied to one end or part, and a conductor of electricity extending through the same and connected to the opposite end or part.

The amount of light obtainable in such lamps may be varied by substituting carbons or bodies of different sizes capable of incandescence. The cylindric form of the carbon or body capable of incandescence is advantageous, in that the light produced by it will be shed alike in all directions outward and its appearance will be similar from all sides. Preferably the hollow cylindric carbon or body capable of incandescence is supported by a rod extending inside it, so that no shadow will be cast from it, and the means for conducting the current of electricity through it will preferably be all arranged so that shadows will not be cast from them.

The accompanying drawing represents a perspective view of an electric lamp embodying my improvements, part of the carbon or body capable of incandescence being broken away the better to show the manner in which it is supported, and has the current of electricity conducted through it.

A designates a carbon or body capable of incandescence. It may be of any suitable kind as regards material, and is made in the form of a hollow cylinder. At the top this carbon or body has fitted to it a spider, B, of metal, provided with a flange overlapping the carbon or body, and thereby connecting it to the same. The flange of the spider might be fitted and secured to the inside of the carbon or body, if desirable, and then it would not cast a shadow. This spider is fitted to the upper end of a metal rod, C, which thus serves to support the carbon or body, and is connected electrically with the carbon or body.

To the lower end of the carbon or body is fitted a band of metal, D, from which, as here shown, extend metal arms E to a ring of metal, F, which is thus in electrical communication with the carbon or body.

The band D might obviously be fitted inside, instead of outside, the carbon or body, and would then cause no shadows.

It is evident that the ring F might be adapted to constitute a support for the carbon, instead of the rod C, or in connection with the rod C.

The rod C is provided at the lower end with a binding-screw, and the ring F is provided with a similar binding-screw, whereby the terminals of an electric circuit may be connected to them, so that a current of electricity may be conducted lengthwise through the carbon or body. The cylindrical form of the carbon or body is advantageous in that it presents the same appearance, and sheds light laterally in all directions. As a carbon or body of this form sheds the light at right angles to its axis, it is more desirable than a spherical or spheroidal carbon, which would shed light in every direction, because it can be placed in position to shed light where it is wanted without uselessly shedding light elsewhere. It is also an advantageous form, for the reason that it provides for conveniently making lamps of different light-producing power by employing a cylinder larger or smaller in length or diameter, or both.

The carbon or body capable of incandescence may be made with a longitudinal opening along one side parallel with the axis, and the current of electricity may then be passed around it circumferentially instead of lengthwise.

This lamp is designed to be burned in a vacuum, and any suitable apparatus may be employed for establishing and maintaining the vacuum for it.

What I claim as my invention, and desire to secure by Letters Patent, is—

1. In an electric lamp, the combination of a hollow carbon or body capable of being rendered incandescent by a current of electricity, with a conductor of electricity applied to one end or part, and a conductor of electricity extending through the same and connected to the opposite end or part, substantially as specified.

2. In an electric lamp, the combination of the carbon or body A, spider B, rod C, band D, arms E, ring F, and means for fastening the terminals of an electric circuit to the rod C and ring F, substantially as specified.

C. A. HUSSEY.

Witnesses:
T. J. KEANE,
ED. GLATZMAYER.